(12) United States Patent
Kamiya et al.

(10) Patent No.: US 6,695,397 B2
(45) Date of Patent: Feb. 24, 2004

(54) VEHICLE ROOF MOLDING

(75) Inventors: Koji Kamiya, Aichi (JP); Fumiaki Uchimura, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 0 days.

(21) Appl. No.: 10/318,112

(22) Filed: Dec. 13, 2002

(65) Prior Publication Data

US 2003/0111869 A1 Jun. 19, 2003

(30) Foreign Application Priority Data

Dec. 14, 2001 (JP) ........................................ 2001-382107

(51) Int. Cl.⁷ ............................................... B62D 25/06
(52) U.S. Cl. ...................................................... 296/210
(58) Field of Search .................................. 296/210, 213

(56) References Cited

U.S. PATENT DOCUMENTS

| 4,792,180 A | * | 12/1988 | Jacobsen et al. | ............. | 296/210 |
| 4,930,279 A | * | 6/1990 | Bart et al. | .................. | 296/213 |
| 5,575,527 A | * | 11/1996 | Pfister | ......................... | 296/210 |
| 5,829,825 A | * | 11/1998 | Kim | ............................ | 296/210 |
| 2002/0180246 A1 | * | 12/2002 | Nagashima et al. | ........ | 296/210 |

FOREIGN PATENT DOCUMENTS

| EP | 0 818 175 | | 1/1998 | | |
| FR | 2680737 A1 | * | 3/1993 | ................. | 296/210 |
| JP | 362283031 A | * | 12/1987 | ................. | 296/210 |
| JP | 402234859 A | * | 9/1990 | ................. | 296/210 |

OTHER PUBLICATIONS

"Plastics Handbook", 1994, McGraw–Hill, Inc., p. 67.*

* cited by examiner

Primary Examiner—Dennis H. Pedder
Assistant Examiner—Jason Morrow
(74) Attorney, Agent, or Firm—Oblon, Spivak, McClelland, Maier & Neustadt, P.C.

(57) ABSTRACT

A vehicle roof molding to be fitted into a roof groove of a roof panel of a vehicle. The vehicle roof molding includes a head portion, a leg portion protruding from the head portion to be fitted in the roof groove, a pair of protruding portions provided on both sides of the leg portion respectively, and a pair of engaging pieces, each provided in the vicinity of the protruding end of protruding portion respectively and including an elastic deforming portion in a root portion thereof and a tip end. The distance between tip ends of the engaging pieces in a free state is set to be larger than a groove width of the roof groove. The engaging piece is press-contacted with the side wall of the roof groove due to a resiliency of elastic deformation of the elastic deforming portion while the leg portion is fitted in the roof groove.

16 Claims, 8 Drawing Sheets

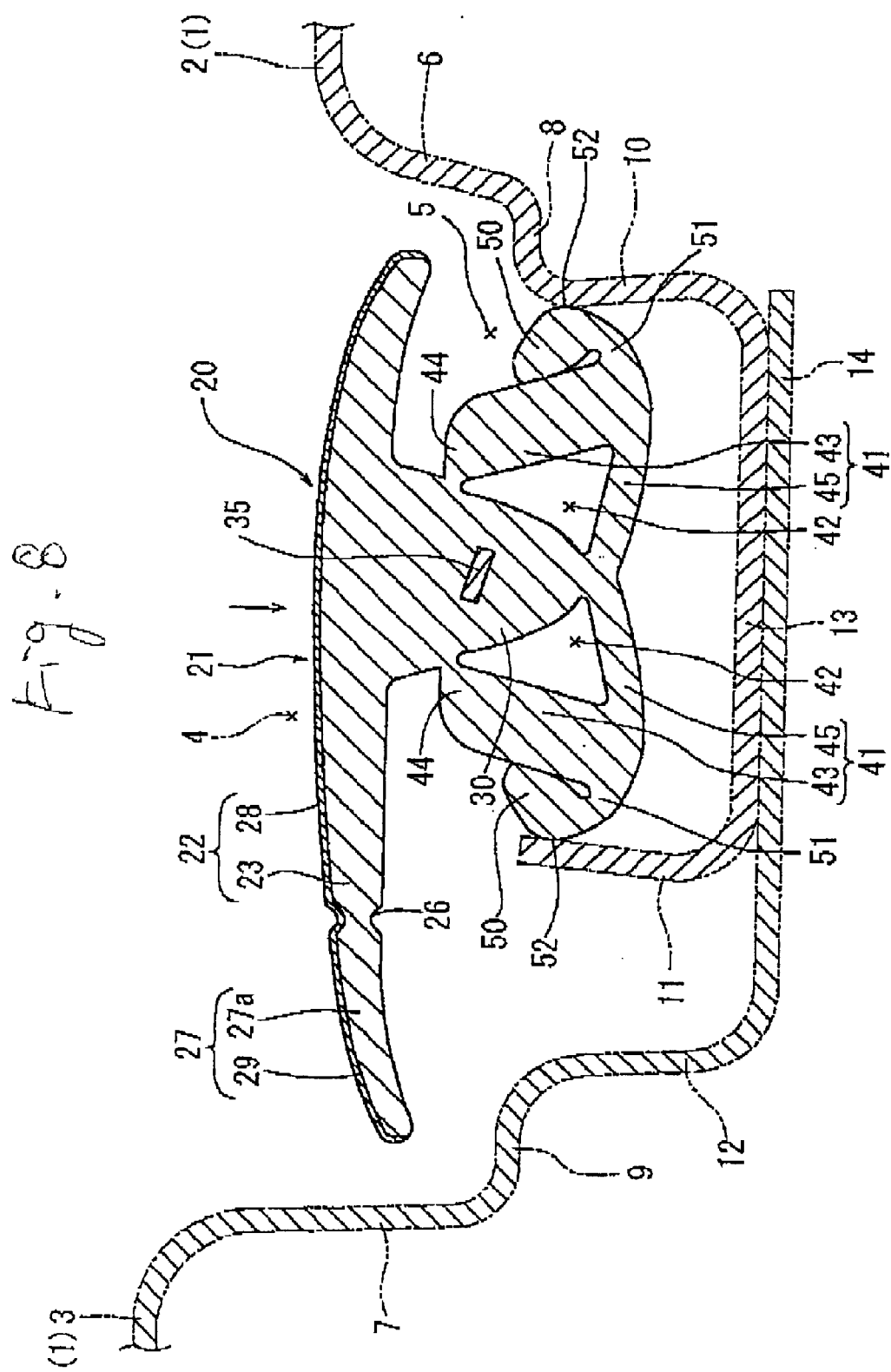

VEHICLE ROOF MOLDING

BACKGROUND OF THE INVENTION

1. Field of the Invention

The present invention relates to a vehicle roof molding that is mounted on a roof panel by fitting it into a roof groove provided on the roof panel.

2. Background Art

A vehicle roof molding of this type is well known in a following manner. There are integrally provided a head portion for filling up at least a part of the roof groove on the roof panel and a leg portion protruding from a backside of the head portion. One pair of engaging lips protrudes from both sides of the leg portion. The pair of engaging lips has a greater thickness in a root portion and get gradually thinner toward a tip end to be elastically deformable.

In the roof molding with such a structure, the pair of engaging lips is elastically deformed to be fitted into the roof groove of the roof panel. The pair of engaging lips is fixed in the roof groove of the roof panel due to a resiliency thereof.

The conventional vehicle roof molding can be easily fitted into the roof groove of the roof panel by reducing a resiliency of elastic deformation of the pair of engaging lips, however, there arises a drawback that the roof molding is likely to get out of the roof groove of the roof panel.

In contrast, the roof molding is not easily disengaged from the roof groove of the roof panel when the resiliency of elastic deformation of the pair of engaging lips increases. However, there arises another drawback that it is difficult to fit it into the roof groove of the roof panel.

SUMMARY OF THE INVENTION

It is an object of the present invention to provide a vehicle roof molding that can easily be mounted on the roof panel by fitting it into the roof groove of the roof panel, in which the roof molding is not easily disengaged when force to pull the roof molding out of the roof groove is applied.

A vehicle roof molding according to the invention includes a head portion for filling up at least a part of the roof groove in a groove width direction, and a leg portion protruding from a backside of the head portion to be fitted in the roof groove. A pair of protruding portions is provided on both sides of the leg portion respectively. Each of the protruding portions protrudes toward a side wall of the roof groove and having a protruding end. A pair of engaging pieces, each provided in the vicinity of the protruding end respectively, includes an elastic deforming portion in a root portion thereof and a tip end.

The distance between the tip ends of the engaging pieces in a free state is set to be larger than a groove width of the roof groove.

According to the invention, the pair of the engaging pieces rotates upward to move closer to each other while the elastic deforming portion are subjected to elastic deformation, when the engaging piece is press-contacted with the side wall of the roof groove.

And the engaging piece is press-contacted with the side wall of the roof groove due to a resiliency of elastic deformation of the elastic deforming portion while the leg portion is fitted in the roof groove.

When the roof molding is mounted in the roof groove of the roof panel, the pair of engaging pieces is pushed into the roof groove while the elastic deforming portions near the tip end of the protruding portions protruding from both sides of the leg portion are subjected to elastic deformation. Thereby, one pair of engaging pieces are rotated upward to move closer to each other at the fulcrum of the elastic deforming portions and easily fitted into predetermined positions in the roof groove.

In the mounted state of the roof molding, the pair of engaging pieces is engaged under pressure against the wall faces on both sides of the roof groove, due to a resiliency of elastic deformation of the elastically deforming portions. The roof molding is held in a predetermined mounted state in the roof groove due to an engagement force (frictional force) between one pair of engaging pieces and the wall faces on both sides of the roof groove.

Also, in the mounted state of the roof molding, when pulling force acts on the roof molding, the pair of engaging pieces are prevented from sliding upward due to a frictional force of the contact portion between the pair of engaging pieces and the wall faces on both sides of the roof groove.

Therefore, when a pulling force is acted on the roof molding, the pair of engaging pieces tends to be rotated to open up at the fulcrum of the elastically deforming portions, but the opening is prevented due to the side walls of the roof groove. Thereby, the pair of engaging pieces is compressed in a direction where the engaging pieces protrude, the engaging pieces act as beams to resist the compression force, so that the pair of engaging pieces is not buckled.

Consequently, a greater frictional force is produced in the contact portion between the pair of engaging pieces and the wall faces on both sides of the roof groove than in the mounted state, and prevents the roof molding from being disengaged.

According to the invention, the protruding portion includes first protruding pieces and second protruding pieces. The first protruding pieces protrude obliquely downward from both sides of the leg portion and includes tip ends. The second protruding pieces protrude from both sides of the lower ends of the leg portion to be integrated with the tip end of the first protruding piece. A cavity portion is formed in a region surrounded by the leg portion and the first and second protruding pieces.

Accordingly, the amount of the material which constitutes the protruding portions can be saved due to the existence of the cavity portion. Further, the protruding portions can have additional elasticity and flexibility to increase the insertion performance.

According to the invention, the first protruding piece is connected integrally with the side of the leg portion via a connecting portion that is elastically deformable and thinner than the first protruding piece.

When the pair of engaging pieces with the leg portion is pushed into the roof groove, the pair of engaging pieces can be rotated to move closer to each other around the fulcrum of the thin connecting portion by elastically deforming the second protruding piece. Therefore, the pair of engaging pieces can be easily fitted into the roof groove in the roof molding mounting portion, as compared to the case in which the protruding portions have a solid and rigid structure.

According to the invention, the head portion, the leg portion, the protruding portions, the elastic deforming portions, and the pair of engaging pieces are made of olefinic thermoplastic elastomer.

Since the olefinic thermoplastic elastomer has a smaller specific gravity than the simple substance of rubber mainly composed of EDEM, or other elastomers, the roof molding with adequate elasticity and light weight can be achieved.

According to the invention, the pair of the engaging pieces and the thinner elastic deforming portions are made of a softer and more elastic material than the protruding portion.

Due to this, it is possible to retain a required resiliency and associated frictional force between the pair of engaging pieces and the wall faces on both sides of the roof groove over long time stably.

The vehicle roof molding according to the invention further comprises a cover portion formed in an outside edge of the head portion in a vehicle width direction. The cover portion is made of an elastic material softer than a material which constitutes a body portion of the head portion.

By this, when the cover portion is mounted in a state of being elastically deformed to be in contact with the roof panel, it is possible to reduce the resiliency due to an elastic deformation thereof. Therefore, even if there is some dispersion in the depth of the roof groove, or in the height of the roof molding itself, it is possible to absorb the dispersion due to the readily elastic deformation of the cover portion. Therefore, it is possible to prevent unforeseen interstice between the cover portion and the roof panel due to the dispersion.

Furthermore, it is possible to relieve the nonconformity that the roof molding is lifted upward to get out of the roof groove due to weak resiliency (reaction force) of elastic deformation of the cover portion.

According to the invention, the cover portion includes a root portion to connect the cover portion with the body portion of the head portion. The root portion is thinner than the rest of the cover portion.

Due to this, the cover portion is readily elastically deformed with a small force in the thin root portion. Therefore, even if there is some dispersion in the depth of the roof groove, or in the height of the roof molding itself, it is possible to absorb the dispersion more favorably due to the elastic deformation of the thin root portion of the cover portion. Moreover, it is possible to relieve the nonconformity that the roof molding is lifted upward to get out of the roof groove due to resiliency of elastic deformation of the thin root portion of the cover portion.

According to the invention, the head portion includes a head body portion and a cover layer provided integrally on a surface of the head body portion in a layer. The cover layer is made of a material more excellent in weather resistance and wear resistance than a material which constitutes the head body portion.

Accordingly, even when subjected to severe environments, the head main portion is protected by the cover layer excellent in weather resistance and wear resistance, making it possible to retain the intrinsic features of the head main portion over a longstanding period.

BRIEF DESCRIPTION OF THE DRAWINGS

FIG. 8 is a transverse cross-sectional view showing an intermediate state in which the vehicle roof molding is fitted into the roof groove of the roof panel.

DETAILED DESCRIPTION OF THE PREFERRED EMBODIMENTS

Embodiment 1

Referring to FIGS. 1 to 5, an embodiment 1 of this invention will be described below.

Figure 1:
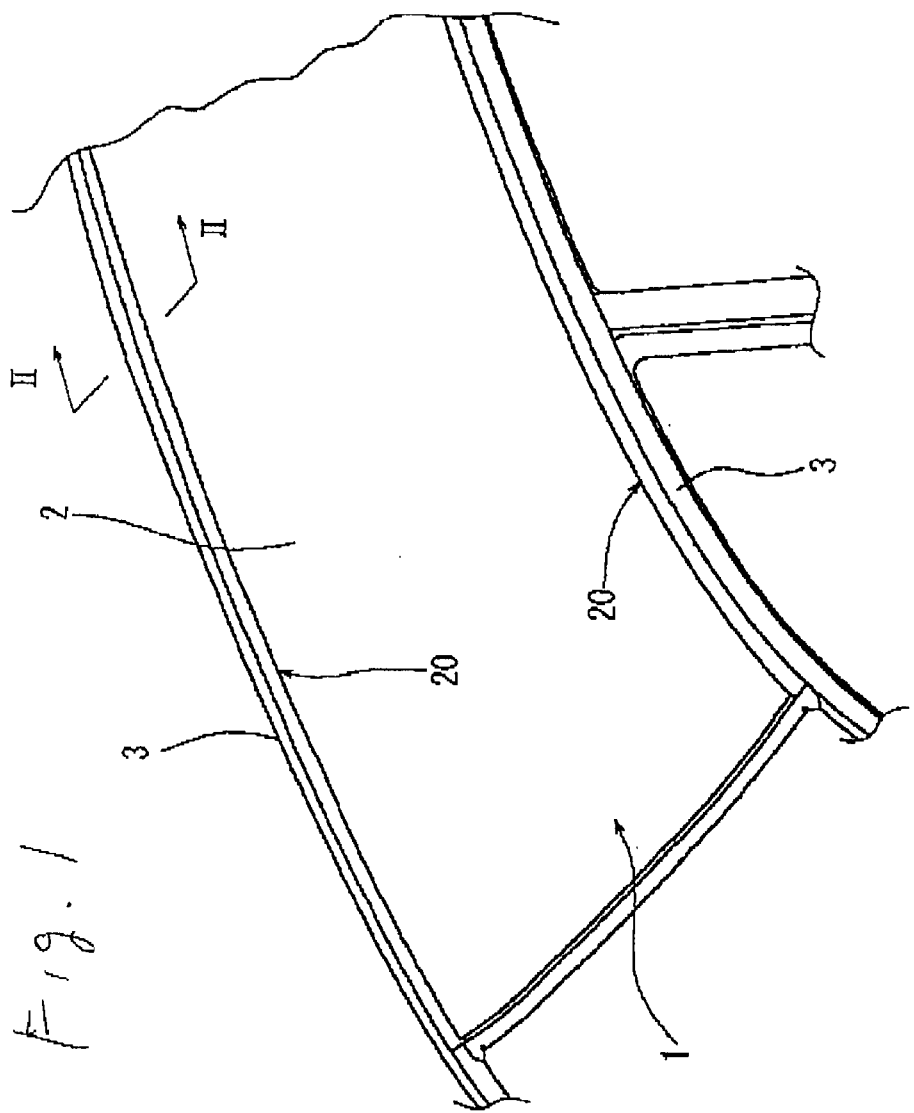
FIG. 1 is a perspective view showing a vehicle root panel mounting a vehicle roof molding from high according to an embodiment of the present invention.
Figure 2:
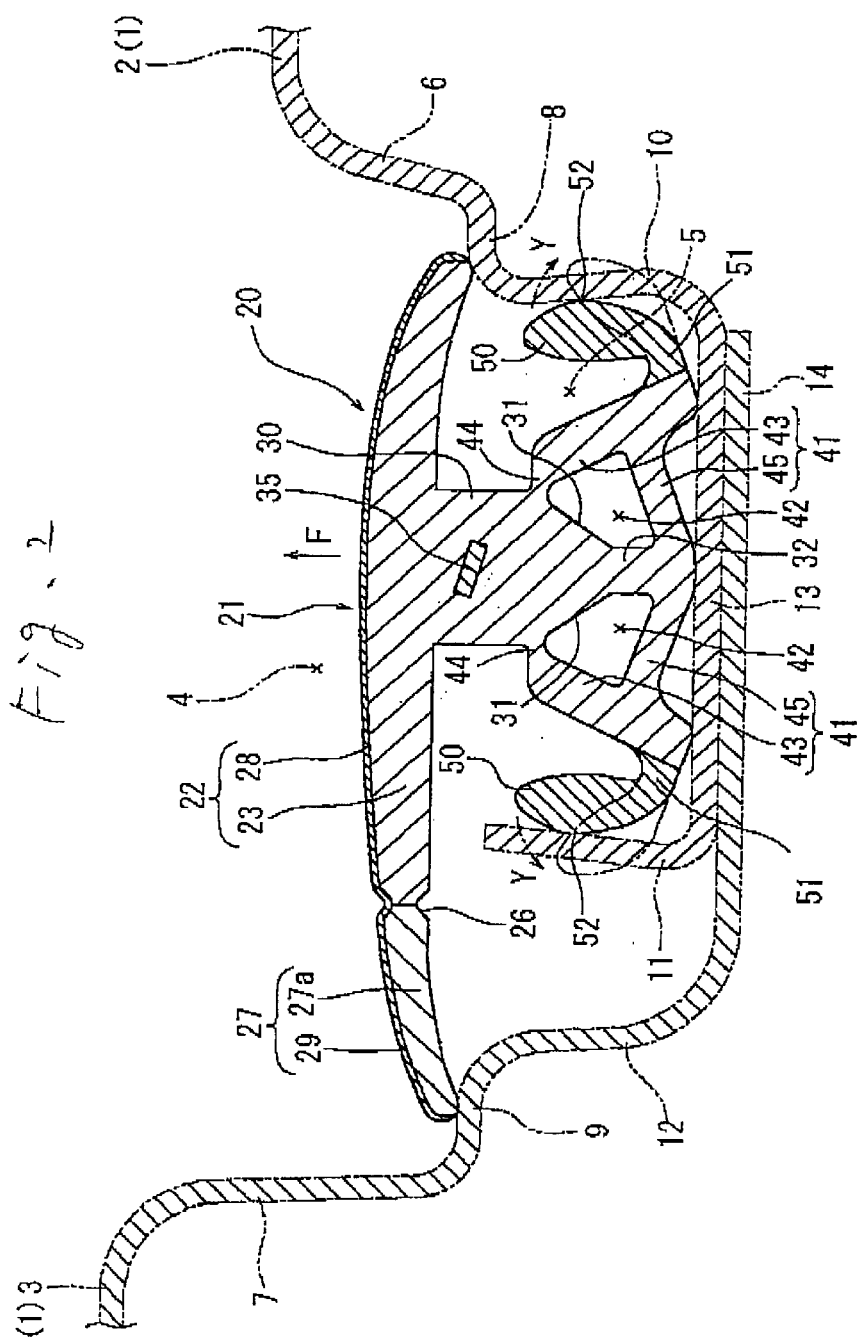
FIG. 2 is a transverse cross-sectional view, taken along the line II—II in FIG. 1, showing a state in which the vehicle roof molding is mounted on the roof panel by fitting it between predetermined positions in the roof groove of the roof panel.
Figure 3:
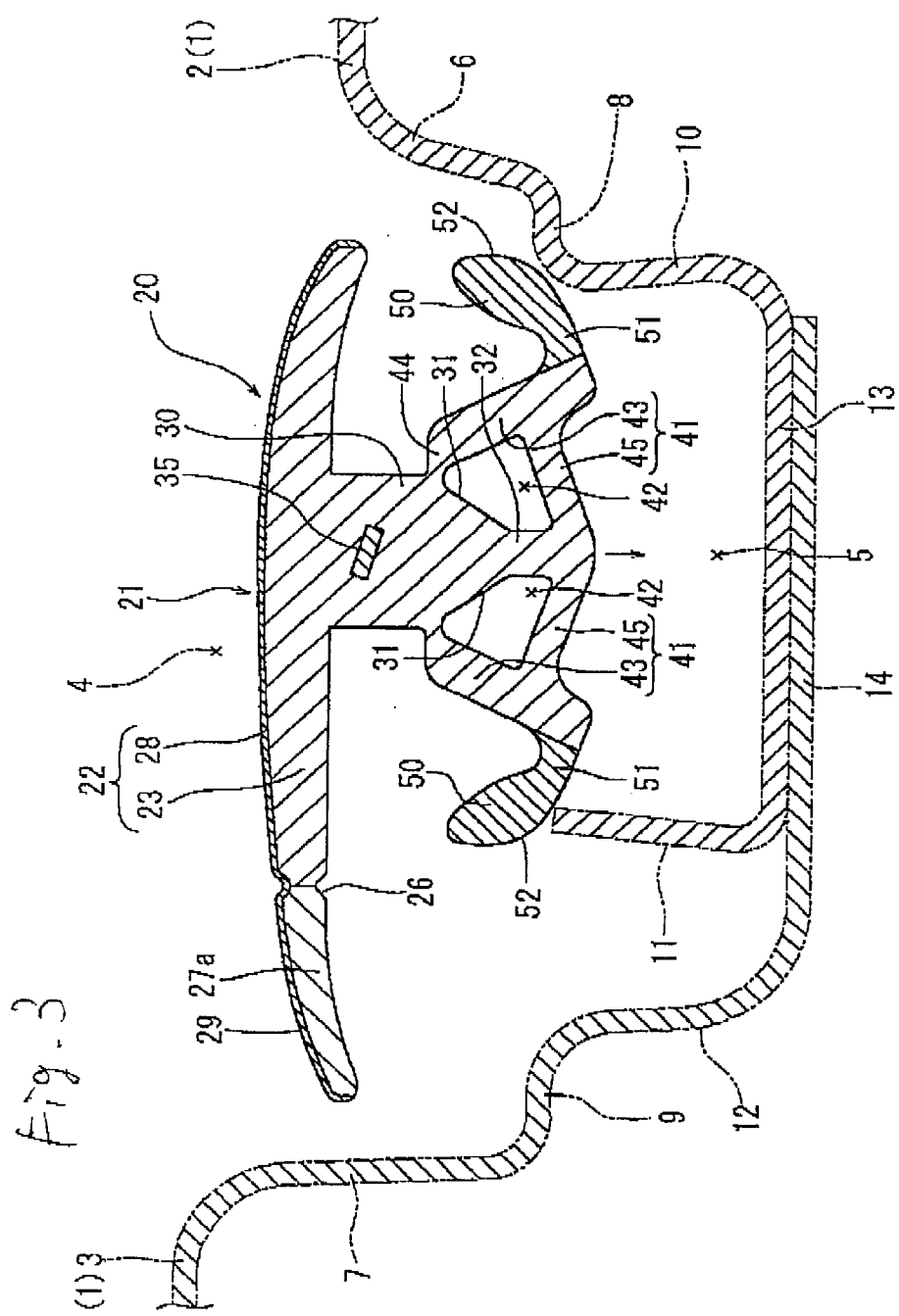
FIG. 3 is a transverse cross-sectional view showing a state immediately before the vehicle roof molding is mounted on the roof panel by pushing it into the root groove of the roof panel.
Figure 4:
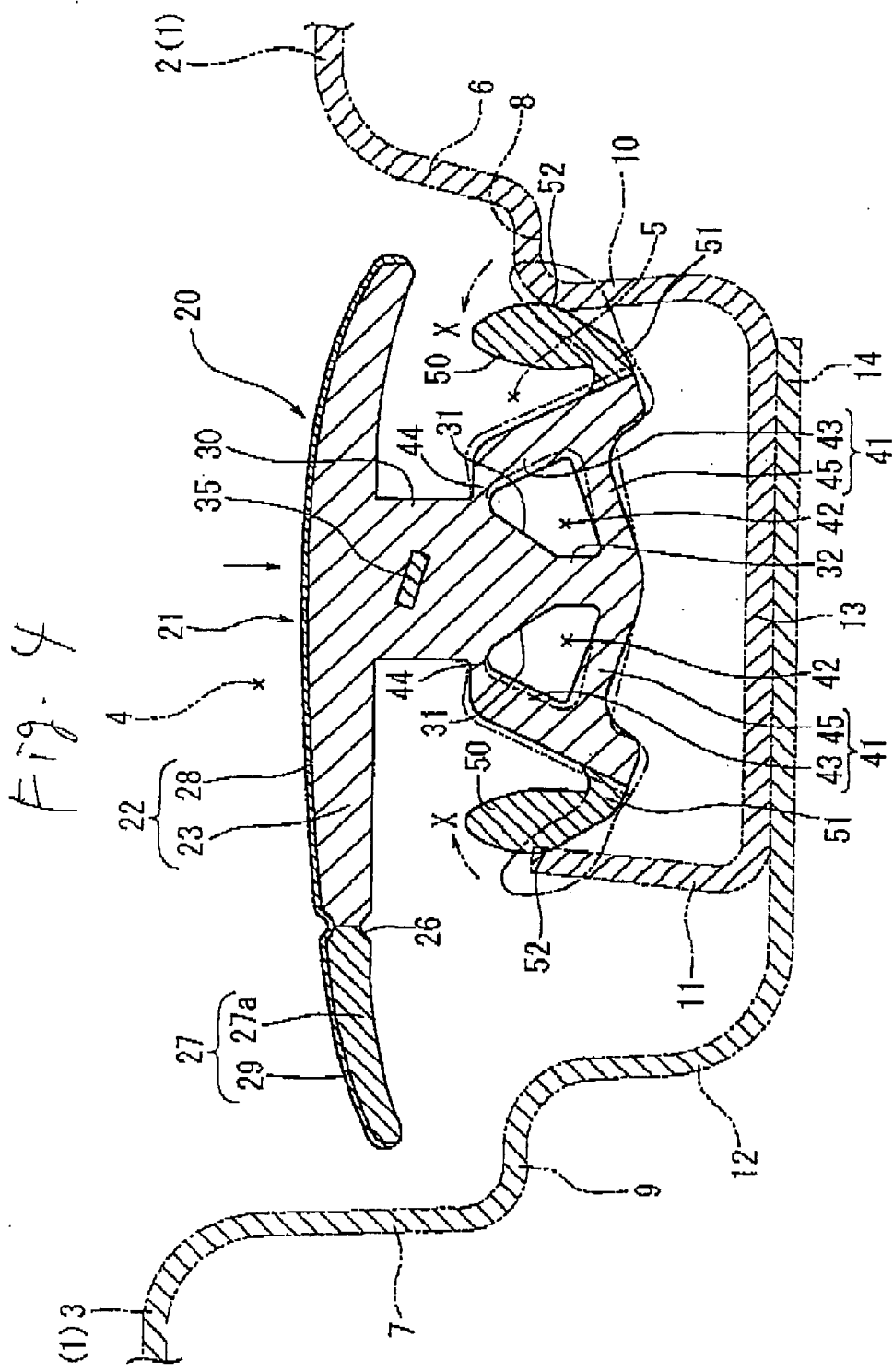
FIG. 4 is a transverse cross-sectional view showing an initial state in which the vehicle roof molding is fitted into the roof groove of the roof panel.
Figure 5:
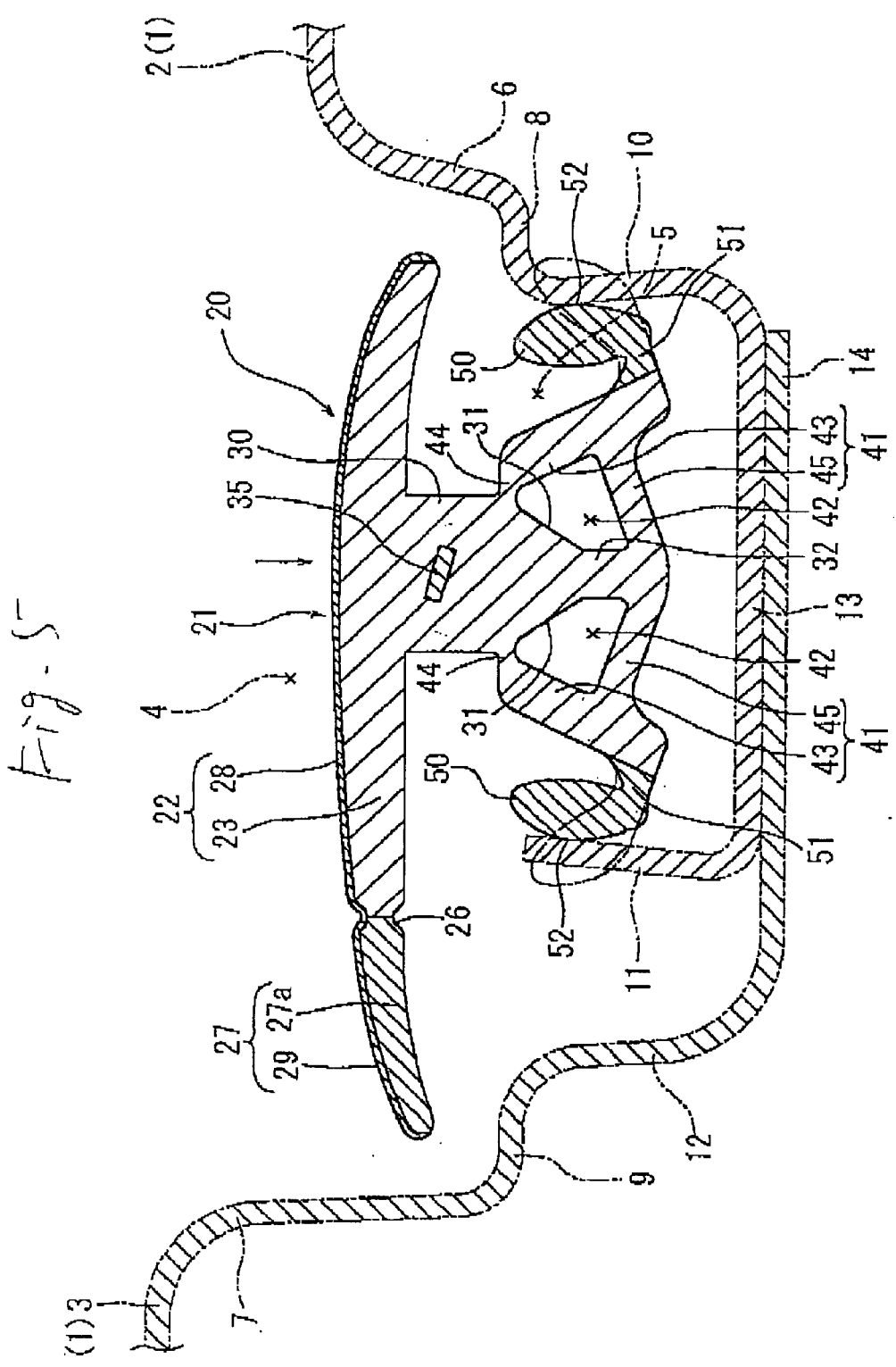
FIG. 5 is a transverse cross-sectional view showing an intermediate state in which the vehicle roof molding is fitted into the roof groove of the roof panel.

FIG. 1 is a perspective view showing a vehicle roof panel, as seen from the oblique above. FIG. 2 is a transverse cross-sectional view, taken along the line II—II in FIG. 1, showing a state in which the vehicle roof molding is mounted on the roof panel by fitting it between predetermined positions in the roof groove of the roof panel. FIG. 3 is a transverse cross-sectional view showing a state immediately before the vehicle roof molding is mounted on the roof panel by pushing it into the root groove of the root panel. FIG. 4 is a transverse cross-sectional view showing an initial state in which the vehicle roof molding is fitted into the roof groove of the roof panel. FIG. 5 is a transverse cross-sectional view showing an intermediate state in which the vehicle roof molding is fitted into the roof groove of the roof panel. In FIGS. 2, 4 and 5, the chain double dashed line of the roof molding represents a shape of the roof molding in free state.

In FIGS. 1 and 2, a roof center panel 2 and a roof side panel 3 are integrally connected by spot welding in the vicinity of both sides of the vehicle roof panel 1. In a connected portion of the roof center panel 2 and the roof side panel 3, there is formed a recess portion 4 extending in the longitudinal direction of a vehicle body and making a groove with step. A roof groove 5 is formed in a deep groove of the recess portion 4 so that the vehicle roof molding 20 is fitted into the roof groove 5 from above.

In this embodiment 1, from the vicinity of both the left and right sides of the roof center panel 2 toward the outer edge, there are formed an inner wall 6 and an inner step portion 8 at the upper stage of the recess portion 4, an inner wall 10 and an upper bottom wall 13 at the lower stage and a first outer wall 11 at the lower stage, each bent by press working.

An outer wall 7 and an outer step portion 9 at the upper stage, and a second outer wall 12 and a lower bottom wall 14 at the lower stage are bent by press working from the vicinity of the inner side of the roof side panel 3 toward an inner terminal edge. The roof center panel 2 and the roof side panel 3 are connected integrally by spot welding in a state where the upper bottom wall 13 and the lower bottom wall 14 are overlapped one on top of the other, thereby forming the recess portion 4 with step groove.

In the roof groove 5 making the deep groove of the recess portion 4, the inner wall 10 at the lower stage and the first outer wall 11 at the lower stage are opposed to be almost like an inverse of character II in transverse cross-section. Thereby, the roof groove 5 is formed almost like a dovetail groove in a cross section having a wide groove bottom and a narrow groove opening.

The long roof molding 20 is pushed from the above to be fitted into the roof groove 5. The long roof molding 20 is integrally provided with a long molding main body 21 made of synthetic resin, rubber or a mixture thereof, and a core 35 made of a strip or rod metal material etc. embedded longitudinally in the molding main body 21. The core is less in stretch than the molding main body 21 and has stiffness.

In this embodiment 1, the molding main body 21 is integrally provided with a head portion 22, a leg portion 30, a pair of protruding portions 41 and a pair of engaging pieces 50, and are made of an elastic material such as olefinic thermoplastic elastomer (TPO). The molding main body 21 is integrally molded lengthwise by extrusion molding.

The head portion 22 fills up at least a part of the recess portion 4 in its width direction. At the tip end portion of the head portion 22 protruding outward in a vehicle width direction, there is integrally formed with a cover portion 27 having a thin root portion 26. The width of the head portion 22 including the cover portion 27 is set to be large enough to cover over the upper face of the inner step portion 8 and the upper face of the outer step portion 9 in the recess portion 4.

The head portion 22 is integrally formed with a head main portion 23 and a cover layer 28 provided in a layer on the surface (upper face) of the head main portion 23. The cover layer 28 is made of an elastic material such as olefinic thermoplastic elastomer more excellent in weather resistance and wear resistance than the head main portion 23, and the cover layer 28 is integrally welded or fused with the maim portion 23 by co-extrusion.

The cover portion 27 is integrally formed with a cover main portion 27a and a cover layer 29 provided in a layer on the surface (upper face) of the cover main portion 27a. The cover layer 29 is made of an elastic material such as olefinic thermoplastic elastomer more excellent in weather resistance and wear resistance than the cover main portion 27a and is continuous with the cover layer 28 of the head portion 22.

The cover main portion 27a is made of an elastic material such as olefinic thermoplastic elastomer that is softer, more elastic and more deformable than the head main portion 23.

The leg portion 30 is formed integrally with the head portion 22 and protrudes from the back face (lower face) of the head portion 22 toward the roof groove 5. The core 35 is embedded along the longitudinal direction inside the leg portion 30.

On both sides of the leg portion 30, inclined portions 31 are so formed as to gradually decrease the leg portion 30 in thickness from an intermediate section of the leg portion 30 to a lower section. A thin tip end portion 32 is formed continuously with the lower end of the inclined portion 31. There are formed protruding portions 41 protruding from the inclined portion 31 across the tip end portion 32 to the wall faces (inner wall 10 at the lower stage and first outer wall 11 at the lower stage) on both sides of the roof groove 5 on both sides of the leg portion 30.

As shown in FIGS. 2 and 3, the protruding portion 41 comprises a first protruding piece 43 and a second protruding piece 45. The first protruding piece 43 protrudes from the upper end (at almost middle height between both sides of the leg portion 30) of the inclined portion 31 in the leg portion 30 obliquely downward. The second protruding piece 45 protrudes slightly obliquely upward from both sides of the terminal edge (lower edge) of the tip end portion 32 in the leg portion 30. The second protruding piece 45 intersects the vicinity of the tip end portion of the first protruding piece 43 to integrate to the tip end portion. There are formed cavity portions 42 to be continuous in the longitudinal direction in a region surrounded by the inclined portions 31 of the leg portion 30, the tip end portion 32, the first protruding piece 43 and the second protruding piece 45. The cavity portions 42 are formed into substantially triangular or rectangular shape in transverse cross section.

In this embodiment 1, the thickness of the first protruding piece 43 is set to be adequately larger than the thickness of the second protruding piece 45, whereby the first protruding piece 43 is less flexible than the second protruding piece 45. Furthermore, the root portion of the first protruding piece 43 is connected integrally with the side of the leg portion 30 by a thin connecting portion 44, which is capable of elastically deforming.

As shown in FIG. 3, a pair of engaging pieces 50 having a thin, elastically deforming portion 51 in the root portion protrude upward and obliquely from the vicinity of the protruding end (lower end of the first protruding piece 43 in this embodiment 1) of both the protruding portions 41 for the leg portion 30.

The pair of engaging pieces 50 are thicker than the thin, elastically deforming portions 51, and formed substantially cocoon-like-shape to be less liable to buckle in the protruding direction (leading from the elastically deforming portion 51 to the tip end of the engaging piece 50) of the engaging pieces 50. The engaging portions 52 capable of press-contacting with the wall faces on both sides (inner wall 10 at the lower stage and first outer wall 11 at the lower stage) of the roof groove 5 are formed on the lower side faces of the pair of engaging pieces 50, respectively.

As shown in FIG. 3, the distance between the distal ends of the pair of engaging pieces 50 is set to be appropriately larger than the size of groove width (maximum groove width) of the roof groove 5 in free state of the roof molding 20.

That is, as shown in FIG. 2, the engaging portions 52 for the pair of engaging pieces 50 are engaged elastically under pressure against the wall faces on both sides (inner wall 10 at the lower stage and first outer wall 11 at the lower stage) of the roof groove 5 due to a resiliency of the elastic deformation of the elastically deforming portion 51 in a state where the roof molding 20 is fitted into the roof groove 5. The roof molding 20 is held in the roof groove 5 in a predetermined mounted state due to an engagement force (frictional force) between the engaging portions 52 for the pair of engaging pieces 50 and the wall faces on both sides in the roof groove 5.

In this embodiment 1, the pair of engaging pieces 50 and the thin, elastically deforming portion 51 are made of an elastic material such as olefinic thermoplastic elastomer (TPO) that is softer, more elastic and more deformable with small force than the protruding portion 41.

In this embodiment 1, the head main portion 23 of the head portion 22, the leg portion 30, the tip end portion 32 and the protruding portion 41 are made of an elastic material such as olefinic thermoplastic elastomer having a Durometer hardness of HDA about 95 to 100 in accordance with JIS•K7215 (e.g., olefinic thermoplastic elastomer made by Riken Technos, Corp. and sold with a trade name "Leostomer").

The cover layers 28 and 29 are made of an elastic material which is more excellent in weather resistance and wear resistance than the head main portion 23, the leg portion 30 and the protruding portion 41 such as olefinic thermoplastic elastomer having a Durometer hardness of HDA about 100 in accordance with JIS·K7215 (e.g., olefinic thermoplastic elastomer made by Riken Technos, Corp. and sold with a trade name "Actymer").

Weather ability stabilizer (ultraviolet absorbing agent, light stabilizer), lubricant (silicone), or the like are mixed into such olefinic thermoplastic elastomer excellent in weather resistance and wear resistance.

The cover main portion 27a of the head portion 22, the pair of engaging pieces 50 and the elastically deforming portion 51 are integrally made of an elastic material such as olefinic thermoplastic elastomer having a Durometer hardness of HDA about 70 in accordance with JIS·K7215 (e.g., olefinic thermoplastic elastomer made by Mitsui Chemicals, Inc. and sold with a trade name "Milastomer") that is softer and more elastic and has less compression set and a greater frictional force against the top coated face of the roof panel than the head main portion 23, the leg portion 30 and the protruding portions 41.

The vehicle roof molding 20 according to the embodiment 1 is constituted as above. Accordingly, when the roof molding 20 is fitted into the roof groove 5 of the top coated roof panel 1, first of all, the roof molding 20 is placed above the roof groove 5 as shown in FIG. 3.

As shown in FIGS. 4 and 5, the pair of engaging pieces 50 are fitted into the roof groove 5 by pushing the pair of engaging pieces 50 into the groove of the roof groove 5 while elastically deforming the elastically deforming portion 51 near the tip end of the protruding portions 41 provided on both sides of the leg portion 30 by applying a pressing force to the roof molding 20. Then the pair of engaging pieces 50 is rotated upward around a fulcrum of the elastically deforming portion 51 to be mutually closed.

Thus, the pair of engaging pieces 50 is rotated upward to move closer to each other (in a direction of arrow X in FIG. 4) at the fulcrum of the elastically deforming portion 51 and easily fitted into predetermined positions of the roof groove 5.

The pair of engaging pieces 50 is fitted into a predetermined position at which a connecting portion between the lower end of the tip end portion 32 of the leg portion 30 and the second protruding portion 45 of the protruding portion 41, or a predetermined position at which the lower end portion of the first protruding piece 43 abuts against the bottom of the roof groove 5 as shown in FIG. 2. In this case, an inner side (right side in FIG. 2) of the head portion 22 is elastically deformed even slightly, so that the lower surface at the tip end portion abuts against the upper surface of the inner step portion 8 of the recess portion 4. Also, the cover portion 27 of the head portion 22 is elastically deformed in the thin root portion 26, and the lower surface at the tip end of the cover portion 27 abuts against the upper surface of the outer step portion 9 in the recess portion 4.

As previously described, the roof molding 20 can be readily fitted into the roof groove 5.

As shown in FIG. 2, the engaging portions 52 for the pair of engaging pieces 50 are pressed against the wall faces on both sides (inner wall 10 at the lower stage and first outer wall 11 at the lower stage) of the roof groove due to a resiliency of the elastic deformation of the elastically deforming portion 51 in a state where the roof molding 20 is fitted. Due to an engagement force (frictional force) between the engaging portions 52 of the pair of engaging pieces 50 and the wall faces on both sides of the roof groove 5, the roof molding 20 is held into the roof groove 5 in a predetermined mounted state.

As shown in FIG. 2, when pulling force acts in a direction of arrow F to the roof molding 20 in a mounted state of the roof molding 20, the pair of engaging pieces 50 is kept from sliding upward, due to a frictional force of the contact section between the engaging portions 52 of the pair of engaging pieces 50 and the wall faces on both sides of the roof groove 5 (inner wall 10 at the lower stage and first outer wall 11 at the lower stage).

Therefore, when the pulling force acts on the roof molding 20 in the direction of arrow F in FIG. 2, the pair of engaging pieces 50 are rotated around the fulcrum of the elastically deforming portions 51 to open out (in a direction of arrow Y in FIG. 2), but the opening is prevented by both side walls of the roof groove 5. By this, although compression force acts on the pair of engaging pieces 50 in protruding direction thereof, the pair of engaging pieces 50 acts as beams to resist a compression force, whereby the pair of engaging pieces 50 are not buckled.

Consequently, the contact section between the pair of engaging portions 52 and the wall face on both sides of the roof groove 5 is subject to a greater frictional force than in the mounted state, whereby the roof molding 20 is prevented from getting out of the roof groove due to its frictional force. When compression force acts on the engaging pieces 50 in the protruding direction of the engaging pieces 50, the compression force is transmitted to the protruding portions 41 via the elastically deforming portions 51. However, the first protruding piece 43 and the second protruding piece 45 of the protruding portions 41 are hardly deformed by a force of a predetermined value or less.

In this embodiment 1, when the roof groove 5 is formed like a dovetail groove having a wide groove bottom and a narrow groove opening, the roof molding 20 is more difficult to get out of the roof groove 5.

In this embodiment 1, the protruding portions 41 protruding from both sides of the leg portion 30 comprises a first protruding piece 43 protruding from the upper end (in almost middle height between both sides of the leg portion 30) of the inclined portion 31 in the leg portion 30 obliquely downward, and a second protruding piece 45 protruding slightly obliquely upward from both sides of the terminal edge (lower edge) of the tip end portion 32 in the leg portion 30, and integrally intersecting to the vicinity of the tip end portion of the first protruding piece 43, as shown in FIG. 3. Further, the cavity portion 42 almost triangular or rectangular in transverse cross section is formed in a region surrounded by the leg portion 30, the first protruding piece 43, the tip end portion 32 and the second protruding piece 45. Therefore, the material for making the protruding portions 41 is saved by the cavity portion 42 to reduce the weight. It is possible to give a slight elasticity or flexibility to the first protruding piece 43 and the second protruding piece 45, whereby the pair of engaging pieces 50 is readily fitted into the roof groove 5.

In this embodiment 1, the thickness of the first protruding piece 43 is set to be appropriately larger than the thickness of the second protruding piece 45, whereby the first protruding piece 43 is less flexible than the second protruding piece 45.

Especially, the root portion of the first protruding piece 43 is connected integrally with the side of the leg portion 30 by a thin connecting portion 44.

Accordingly, when the pair of engaging pieces 50 with the leg portion 30 is pushed into the roof groove 5, it is possible to make the first protruding piece 43 rotate around the fulcrum of the thin connecting portion 44 so as to close the first protruding piece 43 by bending the second protruding piece 45. Therefore, the pair of engaging pieces 50 can be readily fitted into the roof groove 5, as compared to the case when the protruding portions 41 have a solid and rigid structure.

In this embodiment 1, the pair of engaging pieces 50 and the elastically deforming portions 51 are made of an elastic material that is softer and more elastic and less is compressive strain and a greater frictional force on the coated face than the head main portion 23, the leg portion 30 and the protruding portions 41. Therefore, it is possible to retain a required frictional force between the engaging portions 52 of the engaging pieces 50 and both of the side wall surfaces of the roof groove 5 for longstanding period and without deficiency, thereby producing a great effect for preventing the roof molding 20 from getting out of the roof groove 5.

In this embodiment 1, an inner side (right side in FIG. 2) of the head portion 22 is elastically deformed even slightly, so that its lower face abuts against the upper face of the inner step portion 8 of the recess portion 4. On the other hand, the cover portion 27 of the head portion 22 is readily elastically deformed in the thin root portion 26. The lower surface at the tip end of the cover portion 27 abuts against the upper surface of the outer step portion 9 in the recess portion 4.

Therefore, even if there is some deviation in the depth of the recess portion 4 and the roof groove 5, or in the height of the roof molding 20 itself, it is possible to absorb the dispersion due to ready elastic deformation of the thin root portion 26. Due to this, it is possible to prevent unforeseen interstice between the lower surface of the cover portion 27 and the upper surface of the outer step portion 9 caused by the dispersion.

Since the cover main portion 27a is made of an elastic material that is softer and more elastic than the head main portion 23, it is possible to reduce the resiliency due to an elastic deformation of the cover main portion 27a. Therefore, it is possible to relieve the nonconformity that the roof molding 20 is lifted upward to get out of the roof groove 5 due to resiliency of elastic deformation of the cover main portion 27a.

In this embodiment 1, the head portion 22 and the cover portion 27 are provided with the cover layers 28 and 29 excellent in weather resistance and wear resistance on the surface of the head main portion 23 and the cover main portion 27a. Therefore, even when subjected to severe environments, the head main portion 23 and the cover main portion 27a are protected by the cover layers 28 and 29 excellent in weather resistance and wear resistance, making it possible to retain the intrinsic features of the head main portion 23 and the cover main portion 27a over a longstanding period with high durability.

Embodiment 2

Figure 6:
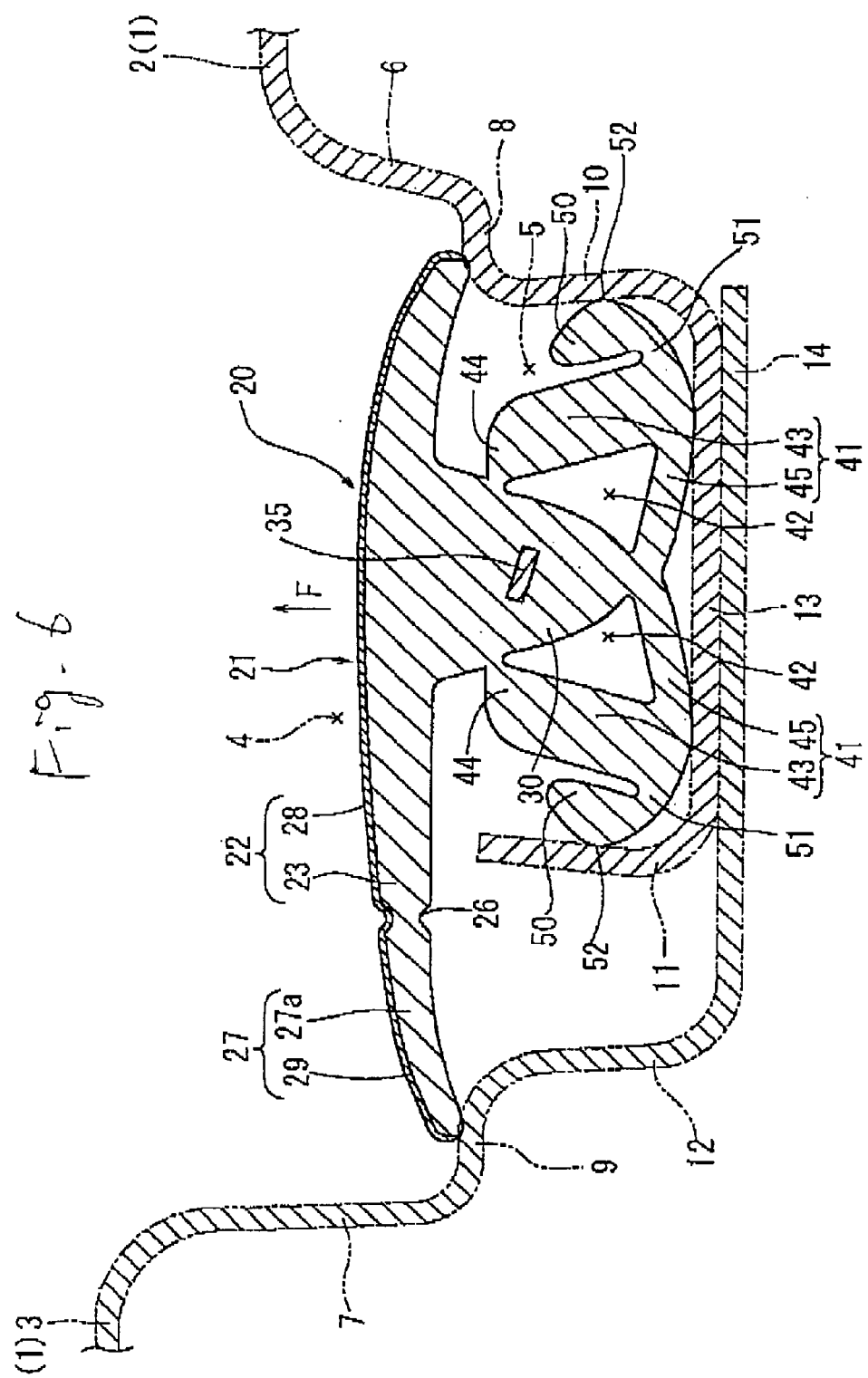
FIG. 6 is a transverse cross-sectional view showing a state in which a vehicle root molding according to an embodiment 2 of this invention is fitted into the roof groove of the roof panel.
Figure 7:
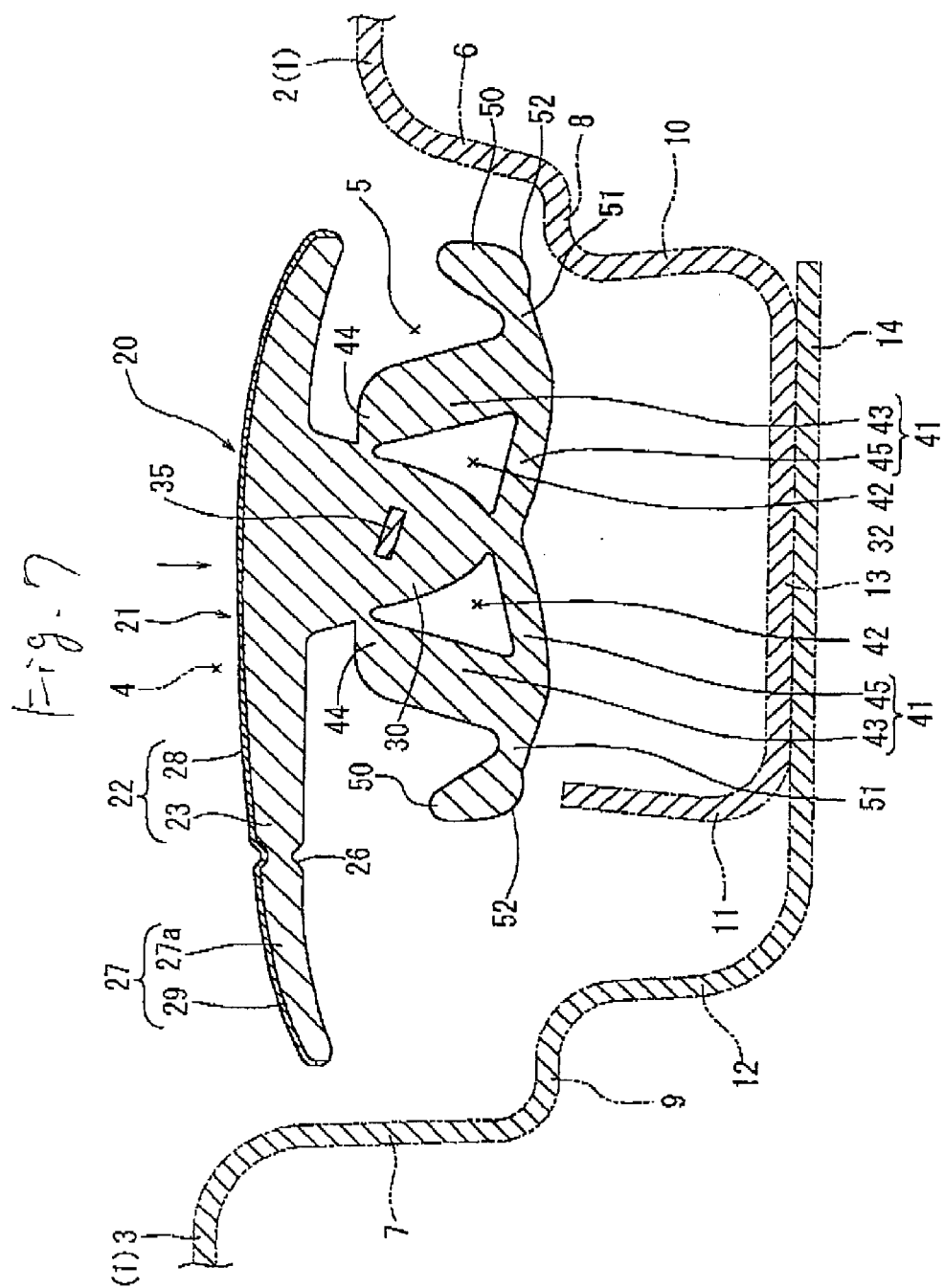
FIG. 7 is a transverse cross-sectional view showing a state before the vehicle roof molding is fitted the roof groove of the roof panel.

Referring to FIGS. 6 to 8, an embodiment 2 of this invention will be described below. FIG. 6 is a transverse cross-sectional view showing a state in which a vehicle roof molding is fitted between predetermined positions into the roof groove of the roof panel. FIG. 7 is a transverse cross-sectional view showing a state before the vehicle roof molding is fitted the roof groove of the roof panel. FIG. 8 is a transverse cross-sectional view showing an intermediate state in which the vehicle roof molding is fitted into the roof groove of the roof panel.

As shown in FIGS. 6 to 8, the vehicle roof molding 20 according to the embodiment 2 has integrally a long molding main body 21 made of synthetic resin, rubber or an admixture thereof, and a core 35 made of a strip or rod metal material embedded in the longitudinal direction of the molding main body 21 and less stretchable and stiffer than the molding main body 21 in the almost same manner as in the previous embodiment 1. The molding main body 21 integrally comprises a head portion 22, a leg portion 30, the protruding portions 41 and a pair of engaging pieces 50. The molding main body 21 is made of elastic material such as olefinic thermoplastic elastomer or the like and integrally molded by extrusion molding.

Especially, this embodiment 2 is different from the embodiment 1 in that the head main portion 23 of the head portion 22, the cover main portion 27a of the cover portion 27, the leg portion 30, the protruding portions 41, the elastically deforming portions 51 and the pair of engaging pieces 50 are made of the same material of olefinic thermoplastic elastomer. The leg portion 30 is formed to gradually decrease in thickness from its root portion (upper end portion) to the tip end portion (lower end portion). On both sides of the leg portion 30, from the vicinity of the upper portion to the tip end portion thereof, there is provided the protruding portions 41 protruding toward each of the side wall faces (inner wall 10 at the lower stage and first outer wall 11 at the lower stage) of the roof groove 5.

As shown in FIG. 7, each protruding portion 41 comprises a first protruding piece 43 protruding from the upper portion on both sides of the leg portion 30 via the thin connecting portion 44 obliquely downward, and a second protruding piece 45 protruding slightly obliquely downward from the lower edge on both side of the leg portion 30 and intersecting the vicinity of the tip end portion of the first protruding piece 43 to be integrated. A cavity portion 42 almost triangular or rectangular in transverse cross section is formed in a region surrounded by the leg portion 30, the first protruding piece 43, the tip end portion 32 and the second protruding piece 45.

In this embodiment 2, the thickness of the first protruding piece 43 is set to be about twice the thickness of the second protruding piece 45, whereby the first protruding piece 43 is less flexible than the second protruding piece 45.

A pair of engaging pieces 50 having thin, elastically deforming portions 51 at the root portion protrude upward obliquely in the vicinity of the protruding end of both the protruding portions 41 of the leg portion 30.

The pair of engaging pieces 50 is thicker than the thin, elastically deforming portions 51, and formed cocoon-like-shape to be less liable to buckling.

As shown in FIG. 7, the distance between the tip ends of the pair of engaging pieces 50 is set to be appropriately larger than the size of groove width (maximum groove width) of the roof groove 5 in free state of the roof molding 20.

As shown in FIG. 6, the engaging portions 52 of the pair of engaging pieces 50 are press-contacted to be elastically engaged with each of the side wall surfaces (inner wall 10 at the lower stage and first outer wall 11 at the lower stage) of the roof groove 5 due to a resiliency of the elastic deformation of the elastically deforming portion 51 in a state where the roof molding 20 is fitted into the roof groove 5.

Since other parts of this embodiment 2 are configured in the almost same manner as in the embodiment 1, the like or same parts are designated by the same numerals, and the description of them is omitted.

As shown in FIG. 8, in the vehicle roof molding 20 of the embodiment 2 constituted as above, the pair of the engaging pieces 50 are fitted into the roof groove 5 by pushing the engaging pieces 50 into the roof groove 5 while elastically deforming the elastically deforming portions 51 in the vicinity of the tip end of the protruding portions 41 provided on each sides of the leg portion 30 by applying a pressing force to the roof molding 20. The pair of the engaging pieces 50 is rotated upward around the fulcrum of elastically deforming portions 51 to be mutually closed.

In this manner, the pair of engaging pieces 50 are rotated upward to move closer to each other around the fulcrum of the elastically deforming portions 51 and readily fitted into predetermined positions of the roof groove 5.

When the pair of engaging pieces 50 with the leg portion 30 are pushed into the roof groove 5, more than a predetermined value of load may act on the protruding portions 41 due to elastic deformation of the elastically deforming portions 51, as shown in FIG. 8. In this case, the first protruding piece 43 of the protruding portions 41 are rotated around a fulcrum of the thin connecting portion 44 to move closer to each other while elastically deforming the second protruding piece 45 in the almost same manner as in the previous embodiment 1. Therefore, the pair of engaging pieces 50 can be readily fitted into the roof groove 5, as compared to the case in which the protruding portions 41 have a solid and rigid structure.

As shown in FIG. 6, the pair of engaging pieces 50 is fitted into predetermined positions at which the lower end of the connecting portion between the first protruding piece 43 and the second protruding piece 45 of the protruding portion 41 abuts against the groove bottom of the roof groove 5. In this case, an inner side (right side in FIG. 6) of the head portion 22 is elastically deformed even slightly, go that its lower face abuts against the upper face of the inner step portion 8 of the recess portion 4.

The cover portion 27 of the head portion 22 is elastically deformed in the thin root portion 26, and the lower surface at the tip end of the cover portion 27 abuts against the upper surface of the outer step portion 9 in the recess portion 4. Thereby, the roof molding 20 can be readily fitted into the roof groove 5.

As shown in FIG. 6, when pulling force acts in a direction of arrow F on the roof molding 20 in a mounted state of the roof molding 20, the pair of engaging pieces 50 are kept from sliding upward due to frictional force of the contacting section between the engaging portions 52 of the pair of engaging pieces 50 and both of the side wall faces of the roof groove 5 (inner wall 10 at the lower stage and first outer wall 11 at the lower stage), as described in the embodiment 1.

Therefore, when a pulling force is applied to the roof molding 20 in the direction of arrow F in FIG. 2, the pair of engaging pieces 50 are rotated around a fulcrum of the elastically deforming portions 51 in a direction to open out, but the opening is prevented by each of the side wall faces of the roof groove 5. Thereby, the pair of engaging pieces 50 are subject to compression in the protruding direction thereof, but the pair of engaging pieces 50 act as beams to resist a compression force, so that the pair of engaging pieces 50 is not buckled.

Consequently, the contact section between the pair of engaging portions 52 and each of the side wall surface of the roof groove 5 is subject to a greater frictional force than in the mounted state, whereby the roof molding 20 is prevented from getting out of the roof groove due to its frictional force.

This invention is not limited to the embodiments 1 and 2.

For example, the embodiments 1 and 2 disclose that the recess portion 4 is formed as a step groove in transverse cross-section and the roof molding 20 is fitted from the above into the roof groove 5 of deep groove portion in the recess portion 4 in, whereas the vehicle roof molding according to this invention can be fitted into the roof groove 5 that is formed almost like U-character in transverse cross-section, although the recess portion is not formed like step groove in transverse cross-section.

The cover portion 27 may not be necessarily formed in the head portion 22. The cover layer 28 of the head portion 22 and the cover layer 29 of the cover portion 27 may be provided as needed. Furthermore, the protruding portions 41 protruding from both side of the leg portion 30 may be formed solid.

As described above, according to the invention, the vehicle roof molding is readily mounted on the roof panel by fitting it into the roof groove provided on the roof panel.

In the mounted state of the roof molding, the roof molding is not easily disengaged from the roof groove, even if subjected to a force to be pulled out of the roof groove.

According to the invention, it is possible to save the material for forming the protruding portions on both sides of the leg portion by forming the cavity portion, whereby the material cost and the weight can be reduced.

According to the invention, the pair of engaging pieces can be easily fitted into the roof groove in the roof molding mounting portion.

According to the invention, it is possible to produce the roof molding with adequate elasticity and light weight.

According to the invention, it is possible to retain a required frictional force between the pair of engaging pieces and each of the side wall surfaces of the roof groove over longstanding period, whereby there is a great effect of preventing the roof molding from being disengaged.

According to the invention, even if there is some dispersion in the depth of the roof groove, it is possible to absorb the dispersion due to elastic deformation of the cover portion. Even in the case where the roof molding is elastically deformed against the roof side panel, it is possible to relieve the nonconformity that the roof molding is lifted upward from the roof groove due to resiliency of elastic deformation of the cover portion.

According to the invention, it is possible to absorb the dispersion more favorably due to elastic deformation of the thin root portion of the cover portion. Moreover, it is possible to relieve the nonconformity that the roof molding is lifted upward from the root groove due to resiliency of elastic deformation of the thin root portion of the cover portion.

According to the invention, even when subjected to severe environments, the head main portion can be protected by the cover layer excellent in weather resistance and wear resistance, making it possible to retain the intrinsic features of the head main portion over longstanding period and increase the durability.

What is claimed is:

1. A vehicle roof molding to be fitted into a roof groove of a roof panel of a vehicle, comprising:

a head portion for filling up at least a part of a the roof groove in a groove width direction;

a leg portion protruding from a back side of the head portion to be fitted in the roof groove;

a pair of protruding portions provided on both sides of the leg portion respectively, each protruding toward a side wall of the roof groove and having a protruding end; and a pair of engaging pieces, each provided in the vicinity of the protruding end respectively and including an elastic deforming portion in a root portion thereof and a tip end;

wherein the distance between the tip ends of the engaging pieces in a free state is set to be larger than a groove width of the roof groove; and the engaging piece is press-contacted with the side wall of the roof groove due to a resiliency of elastic deformation of the elastic deforming portion while the leg portion is fitted in the roof groove, wherein the pair of the engaging pieces rotates upward to move closer to each other when the engaging piece is press-contacted with the side wall of the roof groove, and wherein the elastic deforming portion is formed thinner than the rest of the engaging piece.

2. A vehicle roof molding to be fitted into a roof groove of a roof panel of a vehicle, comprising:

a head portion for filling up at least a part of a the roof groove in a groove width direction;

a leg portion protruding from a back side of the head portion to be fitted in the roof groove;

a pair of protruding portions provided on both sides of the leg portion respectively, each protruding toward a side wall of the roof groove and having a protruding end; and a pair of engaging pieces, each provided in the vicinity of the protruding end respectively and including an elastic deforming portion in a root portion thereof and a tip end;

wherein the distance between the tip ends of the engaging pieces in a free state is set to be larger than a groove width of the roof groove;

the engaging piece is press-contacted with the side wall of the roof groove due to a resiliency of elastic deformation of the elastic deforming portion while the leg portion is fitted in the roof groove;

the protruding portion comprises a first protruding piece and a second protruding piece;

the first protruding piece protrudes obliquely downward from the side of the leg portion and includes a tip end;

the second protruding piece protrudes from a lower end of the leg portion to be integrated with the tip end of the first protruding piece; and a cavity portion is formed in a region surrounded by the leg portion and the first and second protruding pieces.

3. The vehicle roof molding according to claim 2, wherein the first protruding piece is connected integrally with the side of the leg portion via a connecting portion that is elastically deformable and thinner than the first protruding piece.

4. The vehicle roof molding according to claim 1, wherein the head portion, the leg portion, the protruding portions and the pair of engaging pieces are made of olefinic thermoplastic elastomer.

5. A vehicle roof molding to be fitted into a roof groove of a roof panel of a vehicle, comprising:

a head portion for filling up at least a part of a the roof groove in a groove width direction;

a leg portion protruding from a back side of the head portion to be fitted in the roof groove;

a pair of protruding portions provided on both sides of the leg portion respectively, each protruding toward a side wall of the roof groove and having a protruding end; and a pair of engaging pieces, each provided in the vicinity of the protruding end respectively and including an elastic deforming portion in a root portion thereof and a tip end;

wherein the distance between the tip ends of the engaging pieces in a free state is set to be larger than a groove width of the roof groove;

the engaging piece is press-contacted with the side wall of the roof groove due to a resiliency of elastic deformation of the elastic deforming portion while the leg portion is fitted in the roof groove; and the engaging piece and the elastic deforming portions are made of a softer and more elastic material than the protruding portion.

6. A vehicle roof molding to be fitted into a roof groove of a roof panel of a vehicle, comprising:

a head portion for filling up at least a part of a the roof groove in a groove width direction;

a leg portion protruding from a back side of the head portion to be fitted in the roof groove;

a pair of protruding portions provided on both sides of the leg portion respectively, each protruding toward a side wall of the roof groove and having a protruding end; and a pair of engaging pieces, each provided in the vicinity of the protruding end respectively and including an elastic deforming portion in a root portion thereof and a tip end;

wherein the distance between the tip ends of the engaging pieces in a free state is set to be larger than a groove width of the roof groove; and the engaging piece is press-contacted with the side wall of the roof groove due to a resiliency of elastic deformation of the elastic deforming portion while the leg portion is fitted in the roof groove, further comprising a cover portion formed integrally in an outside edge of the head portion in a vehicle width direction;

wherein the cover portion is made of an elastic material softer than a material which constitutes a body portion of the head portion.

7. The vehicle roof molding according to claim 6, wherein the cover portion includes a root portion to connect the cover portion with the body portion of the head portion; and the root portion is thinner than the rest of the cover portion.

8. A vehicle roof molding to be fitted into a roof groove of a roof panel of a vehicle, comprising:

a head portion for filling up at least a part of a the roof groove in a groove width direction;

a leg portion protruding from a back side of the head portion to be fitted in the roof groove;

a pair of protruding portions provided on both sides of the leg portion respectively, each protruding toward a side wall of the roof groove and having a protruding end; and a pair of engaging pieces, each provided in the vicinity of the protruding end respectively and including an elastic deforming portion in a root portion thereof and a tip end;

wherein the distance between the tip ends of the engaging pieces in a free state is set to be larger than a groove width of the roof groove;

the engaging piece is press-contacted with the side wall of the roof groove due to a resiliency of elastic deformation of the elastic deforming portion while the leg portion is fitted in the roof groove;

the head portion includes a head body portion and a cover layer provided on a surface of the head body portion; and the cover layer is made of a material more excellent in weather resistance and wear resistance than a material which constitutes the head body portion.

9. The vehicle roof molding according to claim 1, wherein a core is embedded in the leg portion in the longitudinal direction thereof.

10. The vehicle roof molding according to claim 9, wherein the core is less stretchable than the molding main body.

11. The vehicle roof molding according to claim 10, wherein the core is a strip made of metal material.

12. The vehicle roof molding according to claim 11, the strip is embedded in the leg portion such that the strip is inclined to the bottom surface of the roof groove.

13. The vehicle roof molding according to claim 4, wherein the molding main body is molded lengthwise by extrusion molding of olefinic thermoplastic elastomer.

14. The vehicle roof according to claim 5, wherein the pair of engagement pieces have a Durometer hardness of HDA about 95–100 and the pair of protruding portions have a Durometer hardness of HDA about 70.

15. The vehicle roof molding according to claim 5, wherein the pair of engagement pieces has a greater frictional force against a top coated face of the roof panel than the pair of protruding portions.

16. The vehicle roof molding according to claim 1, wherein the distance between the tip end portions of the pair of the engagement pieces is deformable to be less than the groove width of the roof groove, when the leg portion is fitted in the roof groove.

* * * * *

UNITED STATES PATENT AND TRADEMARK OFFICE
CERTIFICATE OF CORRECTION

PATENT NO. : 6,695,397 B2
DATED : February 24, 2004
INVENTOR(S) : Koji Kamiya et al.

It is certified that error appears in the above-identified patent and that said Letters Patent is hereby corrected as shown below:

<u>Column 13, line 53 through Column 14, line 11,</u>
Delete in its entirety and insert the following:
-- 5. The vehicle roof molding according to claim 1, wherein the engaging piece and the elastic deforming portions are made of a softer and more elastic material than the protruding portion. --

Signed and Sealed this

Twenty-seventh Day of July, 2004

JON W. DUDAS
*Acting Director of the United States Patent and Trademark Office*